United States Patent
Chaganti et al.

(10) Patent No.: US 10,628,170 B1
(45) Date of Patent: Apr. 21, 2020

(54) SYSTEM AND METHOD FOR DEVICE DEPLOYMENT

(71) Applicant: Dell Products L.P., Hopkinton, MA (US)

(72) Inventors: Ravikanth Chaganti, Bangalore (IN); Rizwan Ali, Cedar Park, TX (US); Dharmesh M. Patel, Round Rock, TX (US)

(73) Assignee: Dell Products L.P., Hopkinton, MA (US)

( * ) Notice: Subject to any disclaimer, the term of this patent is extended or adjusted under 35 U.S.C. 154(b) by 92 days.

(21) Appl. No.: 16/151,242

(22) Filed: Oct. 3, 2018

(51) Int. Cl.
*G06F 9/44* (2018.01)
*G06F 9/4401* (2018.01)
*H04L 12/24* (2006.01)

(52) U.S. Cl.
CPC .......... *G06F 9/4406* (2013.01); *G06F 9/4416* (2013.01); *H04L 41/0813* (2013.01); *H04L 41/0886* (2013.01)

(58) Field of Classification Search
CPC . G06F 9/4406; G06F 9/4416; H04L 41/0813; H04L 41/0886
See application file for complete search history.

(56) References Cited

U.S. PATENT DOCUMENTS

| | | | |
|---|---|---|---|
| 7,222,127 B1 | 5/2007 | Bem et al. | |
| 7,516,362 B2 | 4/2009 | Connelly et al. | |
| 7,987,353 B2 | 7/2011 | Holdaway et al. | |
| 8,085,695 B2* | 12/2011 | Kushalnagar | H04L 67/34 370/236 |
| 8,176,150 B2* | 5/2012 | Collins | G06F 8/61 709/202 |
| 8,327,113 B2* | 12/2012 | Ayyar | G06F 13/4081 712/15 |
| 8,386,930 B2 | 2/2013 | Dillenberger et al. | |
| 8,401,982 B1 | 3/2013 | Satish et al. | |
| 8,583,769 B1 | 11/2013 | Peters et al. | |
| 8,868,987 B2 | 10/2014 | Wagner | |
| 8,874,892 B1 | 10/2014 | Chan et al. | |
| 9,122,501 B1 | 9/2015 | Hsu et al. | |
| 9,201,751 B1 | 12/2015 | Muthirisavenugopal et al. | |
| 9,278,481 B2 | 3/2016 | Hull | |
| 9,355,036 B2 | 5/2016 | Beard et al. | |

(Continued)

*Primary Examiner* — Stefan Stoynov
(74) *Attorney, Agent, or Firm* — Chamberlain, Hrdlicka, White, Williams & Aughtry

(57) ABSTRACT

A configurable device includes computing resources. The configurable device further includes an out-of-band management platform that obtains a configuration request for the configurable device to place the configurable device into a predetermined state; in response to obtaining the configuration request, obtains a configurable device profile associated with the configurable device using an out-of-band channel; instantiates a pre-operating system agent based on the configurable device profile using the computing resources; loads an operating system package into the computing resources using an in-band channel secured by the pre-operating system agent; boots the configurable device using: the operating system package, and the computing resources; and, after booting the configurable device, orchestrates post-operating system automation of the configurable device to place the configurable device into the predetermined state.

20 Claims, 12 Drawing Sheets

(56) References Cited

U.S. PATENT DOCUMENTS

| | | |
|---|---|---|
| 9,898,224 B1 | 2/2018 | Marshak et al. |
| 10,057,184 B1 | 8/2018 | Prahlad et al. |
| 10,097,620 B2 | 10/2018 | Reddy et al. |

* cited by examiner

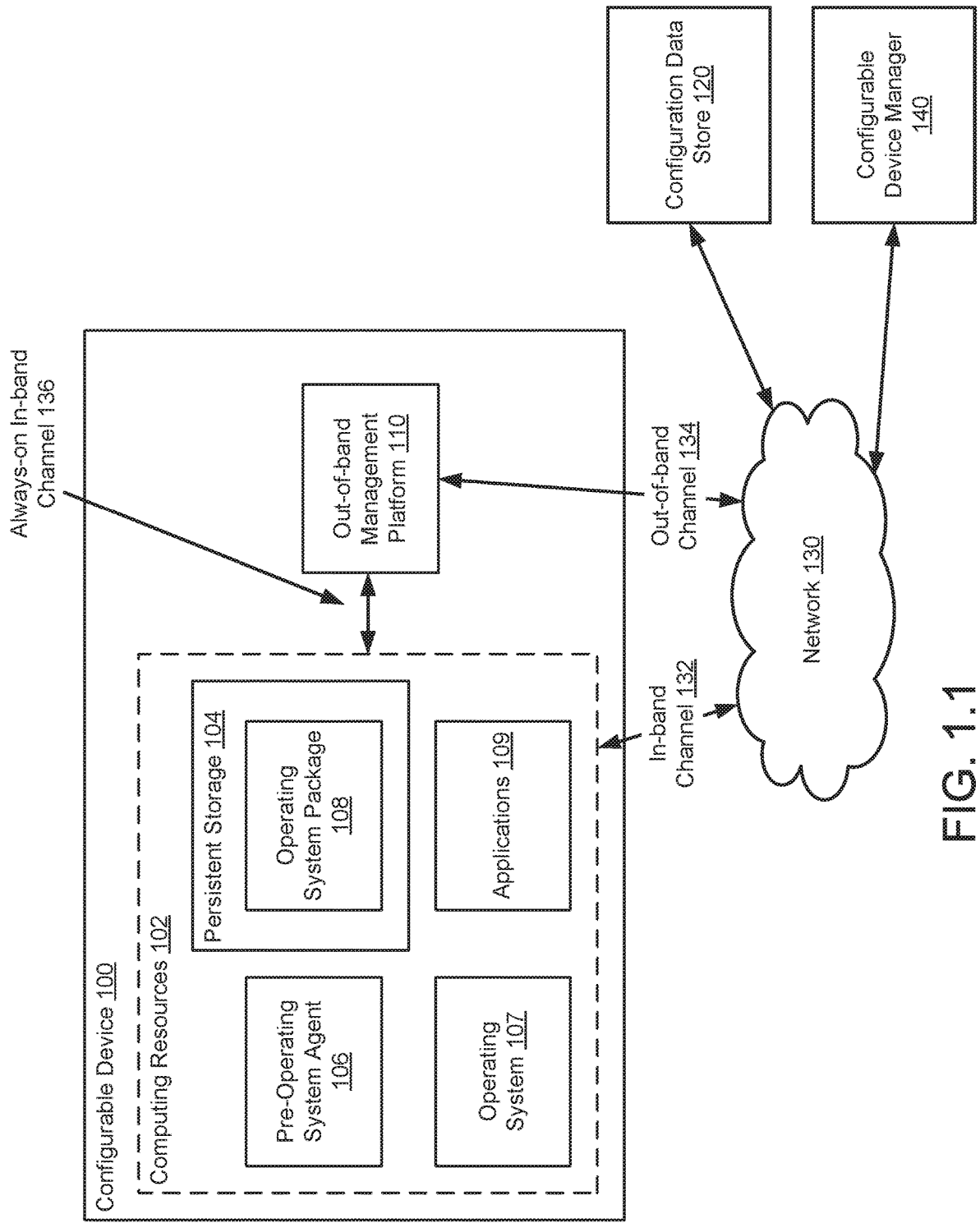
FIG. 1.1

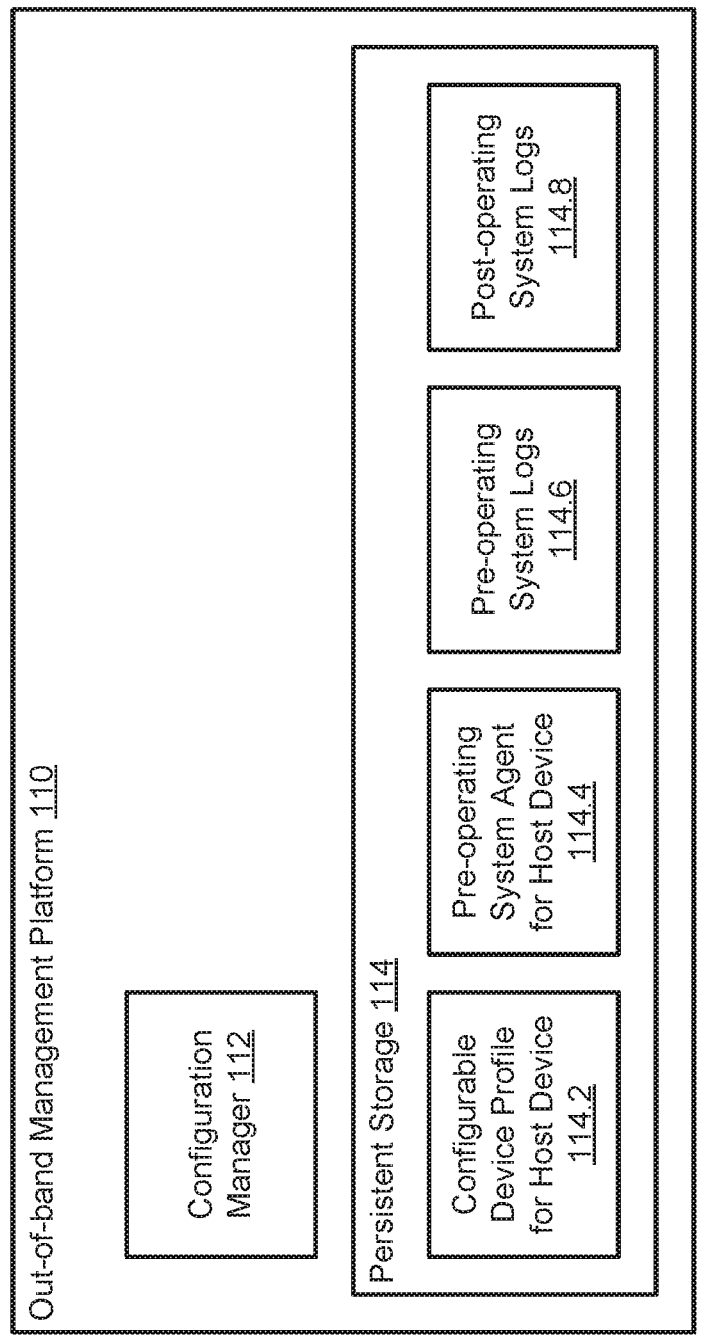
FIG. 1.2

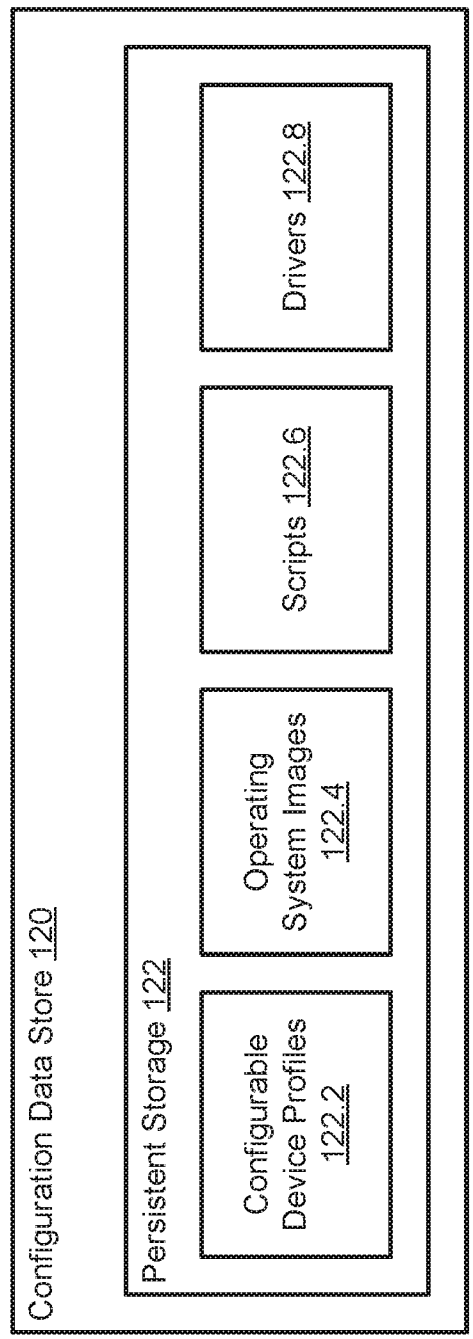
FIG. 1.3

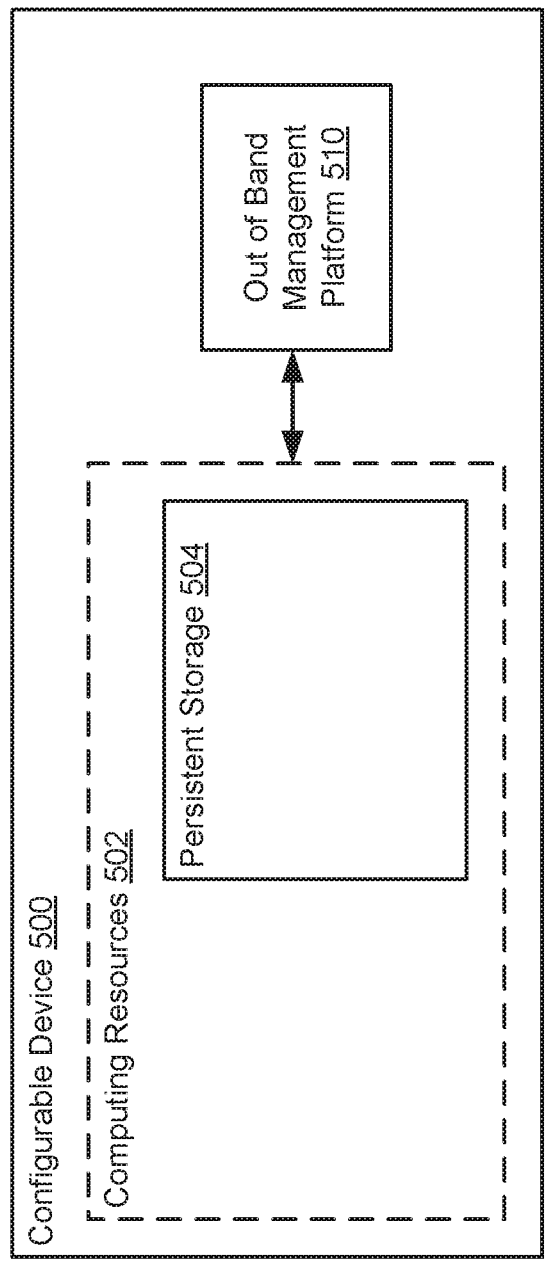
FIG. 5.1

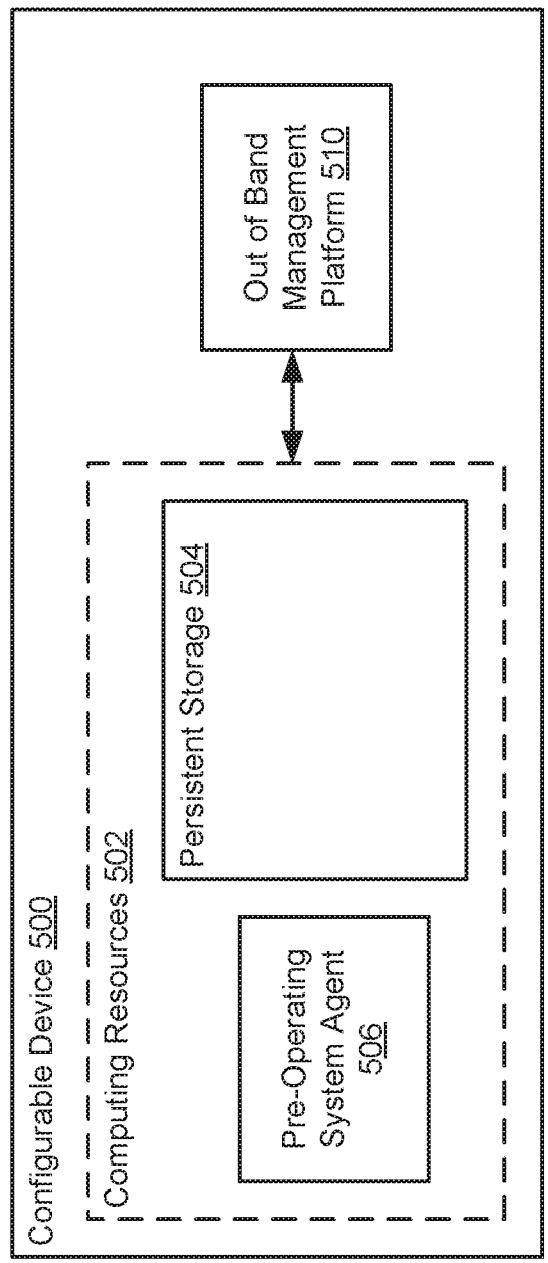
FIG. 5.2

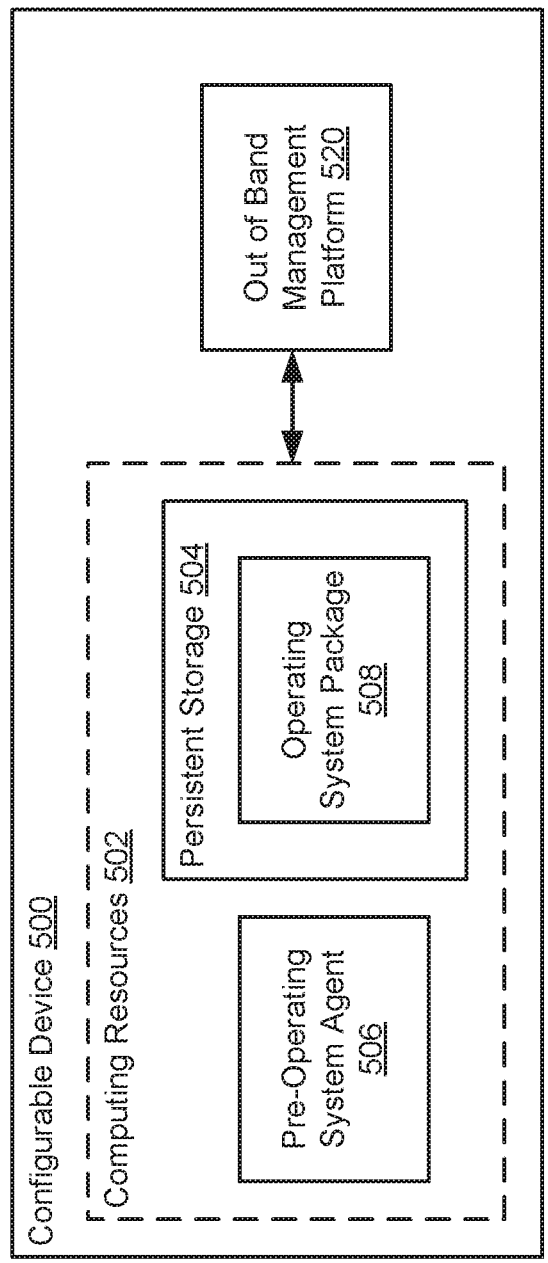
FIG. 5.3

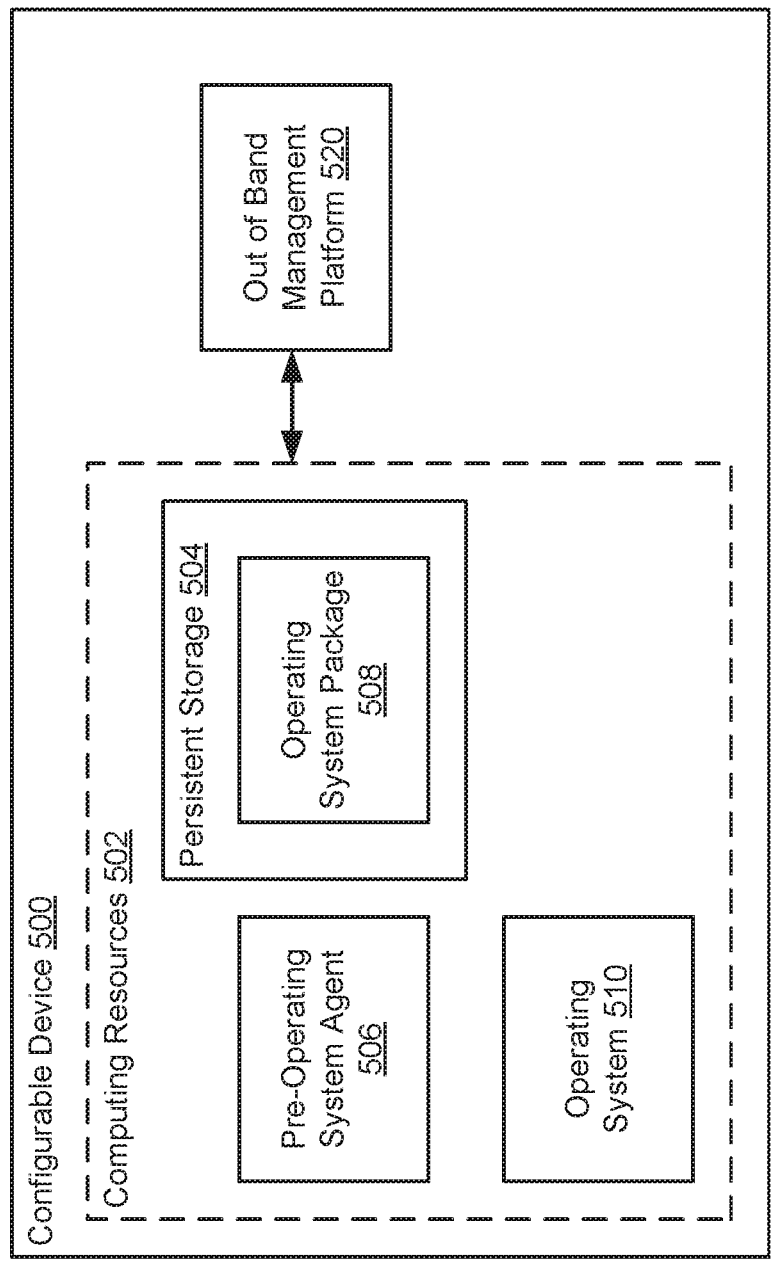
FIG. 5.4

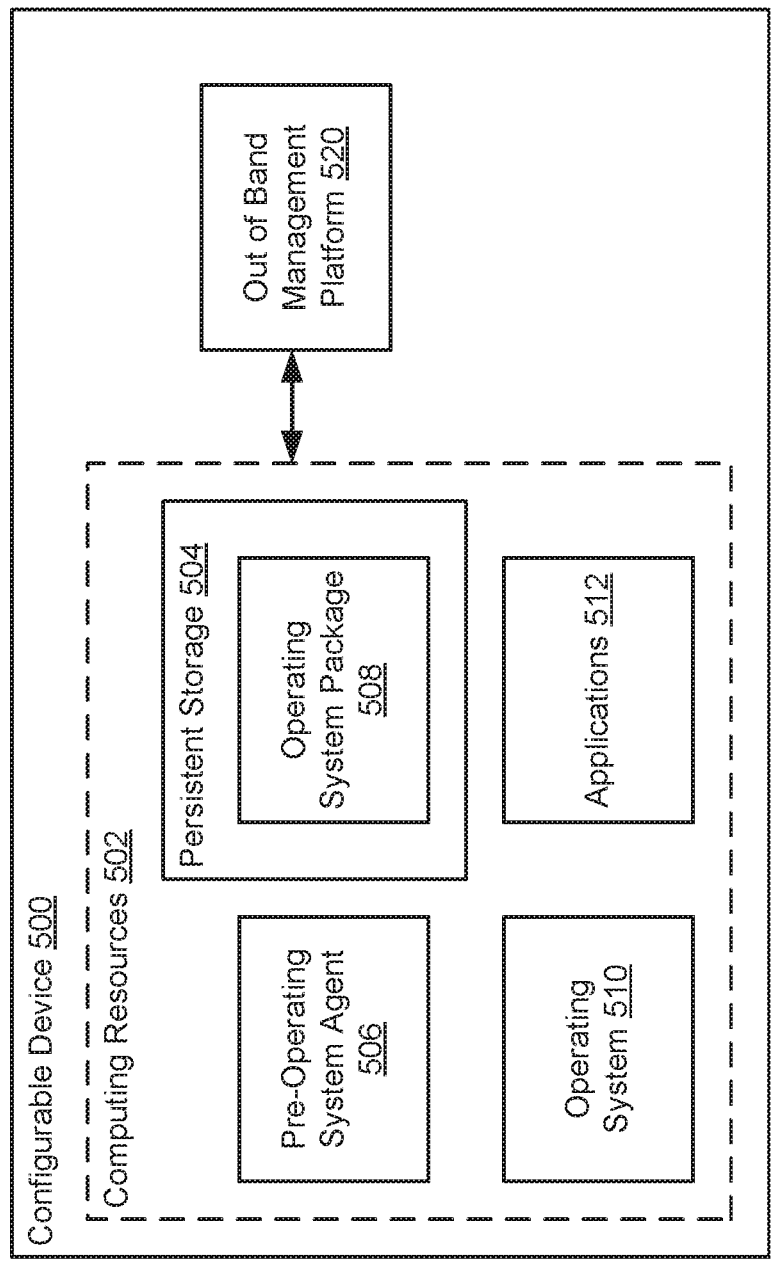
FIG. 5.5

SYSTEM AND METHOD FOR DEVICE DEPLOYMENT

BACKGROUND

Computing devices may provide services to other computing devices. For example, a computing device hosting application such as a website server may provide services to other computing devices by serving webpages to the other computing devices. The computing devices may be connected by operable connections such as, for example, the Internet. The computing devices may host any number of applications. Each of applications may provide different types, or the same types, of services.

To provide services to other devices, computing devices may be configured. Configuring a computing device may change the manner in which the computing device operates. For example, different instructions may be executed by a processor of a computing device giving rise to a different service being provided by the computing device after configuration.

SUMMARY

In one aspect, a configurable device in accordance with one or more embodiments of the invention includes computing resources. The configurable device further includes an out-of-band management platform that obtains a configuration request for the configurable device to place the configurable device into a predetermined state; in response to obtaining the configuration request, obtains a configurable device profile associated with the configurable device using an out-of-band channel; instantiates a pre-operating system agent based on the configurable device profile using the computing resources; loads an operating system package into the computing resources using an in-band channel secured by the pre-operating system agent; boots the configurable device using: the operating system package, and the computing resources; and, after booting the configurable device, orchestrates post-operating system automation of the configurable device to place the configurable device into the predetermined state.

In one aspect, a method for configuring a configurable device in accordance with one or more embodiments of the invention includes obtaining a configuration request for the configurable device to place the configurable device into a predetermined state, wherein the configuration request is obtained using an out-of-band channel associated with the configurable device; in response to obtaining the configuration request, obtaining a configurable device profile associated with the configurable device using the out-of-band channel associated with the configurable device; instantiating a pre-operating system agent based on the configurable device profile using computing resources of the configurable device; loading an operating system package into the computing resources using an in-band channel secured by the pre-operating system agent; booting the configurable device using the operating system package and the computing resources; and, after booting the configurable device, orchestrating post-operating system automation of the configurable device to place the configurable device into the predetermined state.

In one aspect, a non-transitory computer readable medium in accordance with one or more embodiments of the invention includes computer readable program code, which when executed by a computer processor enables the computer processor to perform a method for configuring a configurable device. The method includes obtaining a configuration request for the configurable device to place the configurable device into a predetermined state, wherein the configuration request is obtained using an out-of-band channel associated with the configurable device; in response to obtaining the configuration request, obtaining a configurable device profile associated with the configurable device using the out-of-band channel associated with the configurable device; instantiating a pre-operating system agent based on the configurable device profile using computing resources of the configurable device; loading an operating system package into the computing resources using an in-band channel secured by the pre-operating system agent; booting the configurable device using the operating system package and the computing resources; and, after booting the configurable device, orchestrating post-operating system automation of the configurable device to place the configurable device into the predetermined state.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an out-of-band management platform in accordance with one or more embodiments of the invention.

FIG. 1.3 shows a diagram of a configuration data store in accordance with one or more embodiments of the invention.

FIG. 5.1 shows a diagram of an example system at a first point in time.

FIG. 5.2 shows a diagram of the example system at a second point in time.

FIG. 5.3 shows a diagram of the example system at a third point in time.

FIG. 5.4 shows a diagram of the example system at a fourth point in time.

FIG. 5.5 shows a diagram of the example system at a fifth point in time.

DETAILED DESCRIPTION

Figure 2:
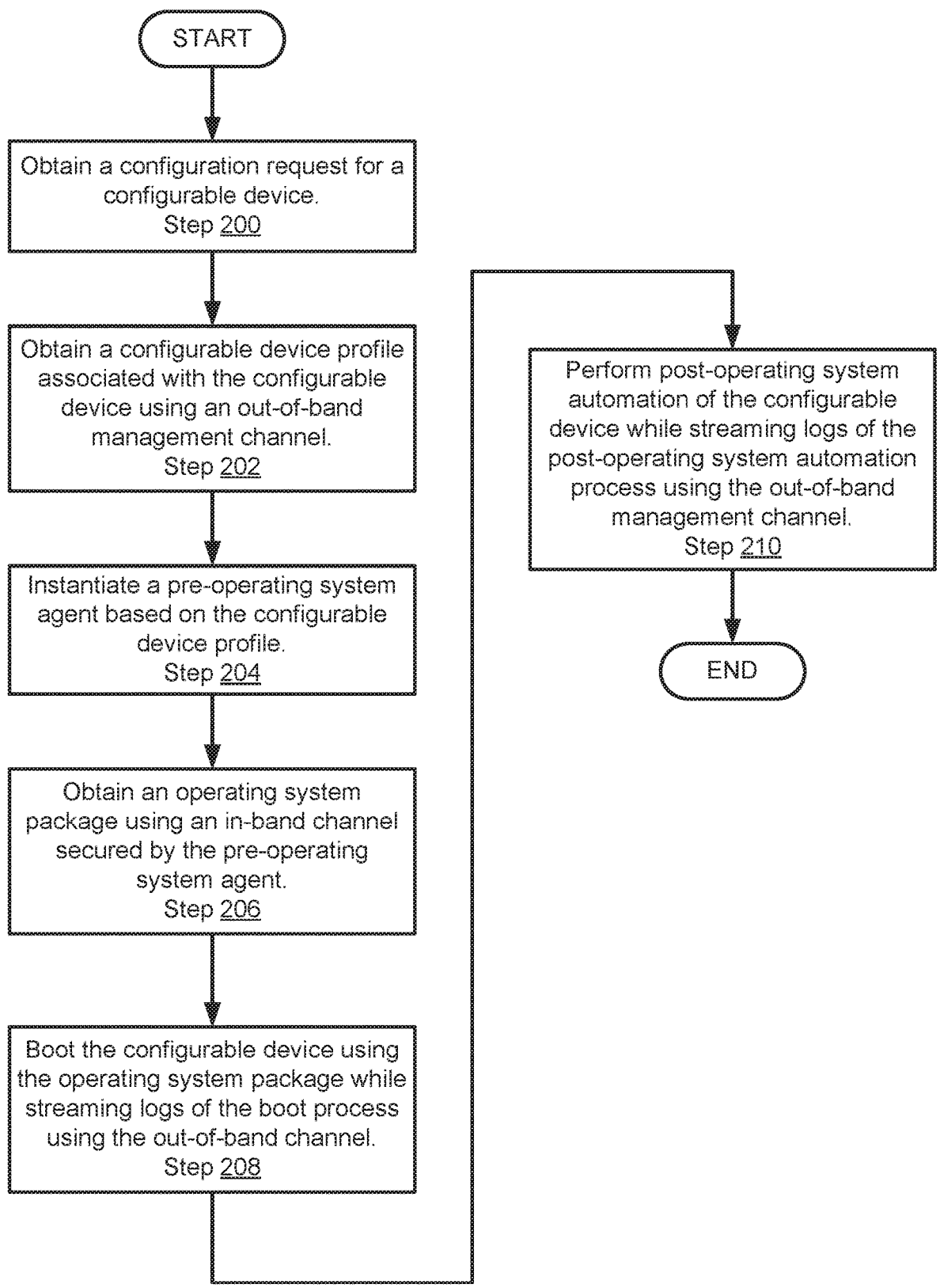
FIG. 2 shows a flowchart of a method of configuring a configurable device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regards to a corresponding like-named component in any other figure.

In general, embodiments of the invention relate to systems, devices, and methods for configuring any number of configurable devices. Additionally, embodiments of the invention may provide for the continuous monitoring of configuration processes of configurable devices. By doing so, embodiments of the invention may reduce a time required for detection of a configuration failure.

In one or more embodiments of the invention, a configurable device includes computing resources, that are to be configured, and an out-of-band management platform. The out-of-band management platform may be a hardware entity that operates independently of the computing resources. For example, the out-of-band management platform may be an expansion card hosted by a mainboard of the computing resources. The expansion card may be directly connected to the mainboard of the computing resources via a dedicated bus. Thus, an always on connection between the expansion card and the computing resources may be present.

In one or more embodiments of the invention, the computing resources may be in an un-configured state. In other words, the computing resources may not host software or be configured in a manner that would enable them to configure themselves. To configure the computing resources, the out-of-band management platform may reconfigure the computing resources, instantiate entities hosted by the computing resources, and/or perform other actions on the computing resources to place the computing resources in a predetermined state.

In one or more embodiments of the invention, the out-of-band management platform may support an out-of-band connection separate from an in-band connection supported by the computing resources of the configurable device. By doing so, embodiments of the invention may provide configuration services to the computing resources of the configurable device while the computing resources are unable to configure themselves. For example, the out-of-band management platform may obtain configuration information used to configure the computing resources via the out-of-band channel.

In one or more embodiments of the invention, the out-of-band management platform streams logs of the configuration process performed on the computing resources to other entities. By doing so, the out-of-band management platform may notify other entities of potential configuration failures during the configuration process and, consequently, decrease the time required to identify configuration failures. The out-of-band management platform may stream the logs using the out-of-band channel.

FIG. 1.1 shows a diagram of an example system in accordance with one or more embodiments of the invention. The example system may provide configuration services to a configurable device (100). While illustrated as only including a single configurable device (e.g., 100), systems in accordance with embodiments of the invention may include any number of configurable devices.

To provide configuration services to the configurable device (100), the system may further include a configuration data store (120) that provides data for configuring the configurable device (100), and a configurable device manager (140) that may manage the configurable device (100) after and/or during configuration of the configurable device (100).

Any of the devices of FIG. 1.1 may be operably connected by any combination of wired and/or wireless networks. For example, the configurable device (100) may be operably connected to the configuration data store (120) and/or the configurable device manager (140) by a network (130). Additionally, the system may include at least one in-band channel (e.g., 132) associated with the configurable device (100) and at least one out-of-band channel (134) associated with the configurable device (100).

While for the sake of brevity the system of FIG. 1.1 has been illustrated as including a limited number of components, embodiments of the invention may include additional components without departing from the invention. Each component of the system of FIG. 1.1 is described below.

The configurable device (100) may provide services to other entities (not shown). For example, the configurable device (100) may host any number of applications (109) that provide computing services to other entities. The computing services may be, for example, database services, email services, instant messaging services, file storage services, and/or any other type of computer implemented services. The other entities may be, for example, clients that rely on the services provided by the applications (109). Alternatively, the other entities may be, for example, other configurable devices of a distributed system that provides predetermined functionality. For example, the configurable device (100) may be one device of multiple devices of a distributed system. The configurable device (100) may be adapted to receive configuration instructions from other entities to self-configure. Self-configuring the configurable device (100) may place the configurable device (100) into a predetermined state. The predetermined state may enable the configurable device (100) to cooperatively perform functions of the distributed system with other configurable devices of the distributed system.

The configurable device (100) may be a physical device. The physical device may be a computing device. The computing device may be, for example, a mobile phone, tablet computer, laptop computer, desktop computer, server, or cloud resource. The configurable device (100) may be other types of computing devices without departing from the invention. To provide the above-noted functionality of the configurable device (100), the computing device may include computing resources (102) and host an out-of-band management platform (110). Each of these components of the computing device is discussed below.

Figure 6:
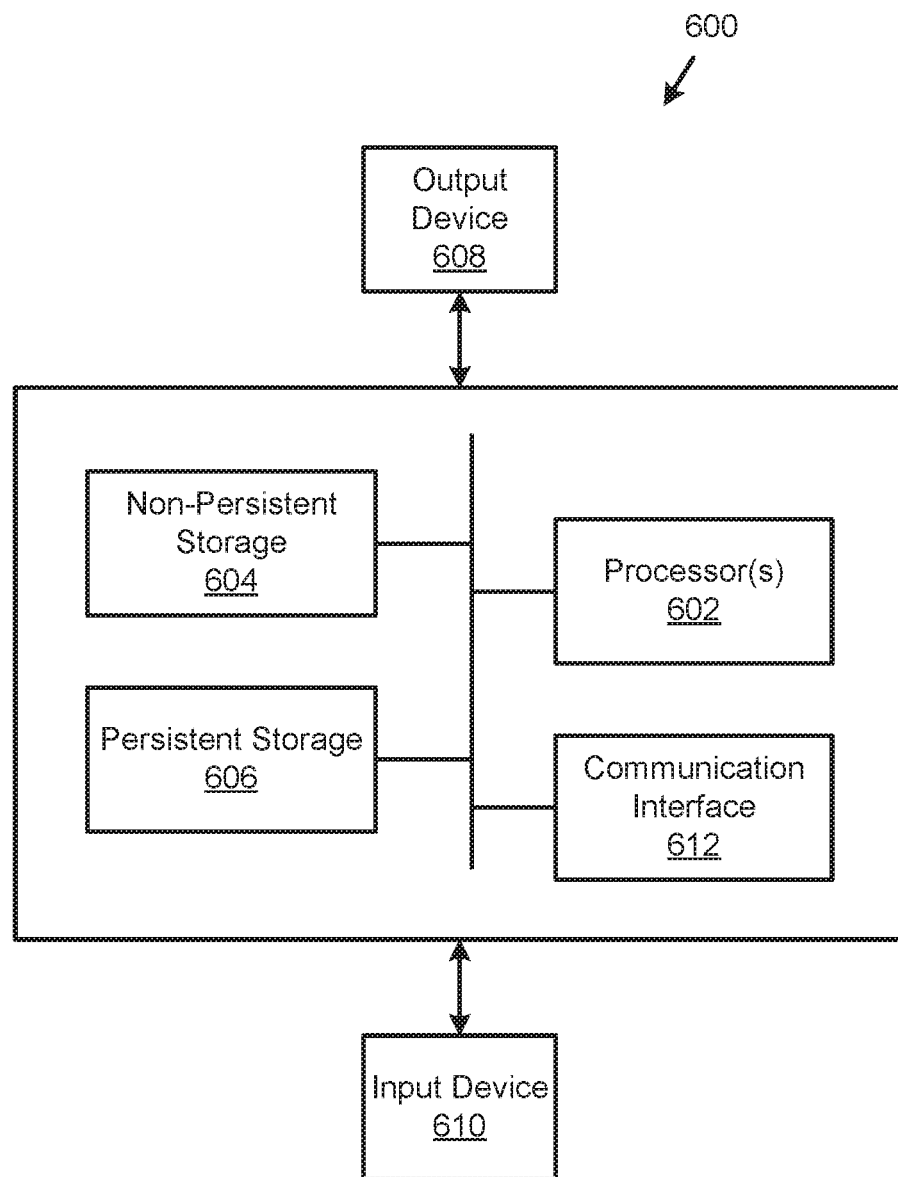
FIG. 6 shows a diagram of a computing device in accordance with one or more embodiments of the invention.

In one or more embodiments of the invention, the computing resources (102) include both physical and virtualized resources. The physical resources may include one or more processors, memory (e.g., random access memory), and persistent storage (104) (e.g., disk drives, solid state drives, etc.). An example of physical resources of a computing device is shown in FIG. 6. The persistent storage may store computer instructions, e.g., computer code, that when executed by the processor(s) of the computing device cause the computing device to perform the functions of the configurable device (100) described in this application and/or all, or a portion, of the methods illustrated in FIGS. 2-4. The physical resources may include additional, fewer, or different hardware resources without departing from the invention.

The virtualized resources may include a pre-operating system agent (106), an operating system (107), and the applications (109). Each of these virtualized resources may be applications.

The pre-operating system agent (106) may provide configuration services to the configurable device (100). For example, when a configurable device is initially powered on, the configurable device may not host an operating system or other entities that enable it to perform its desired functionality. To configure the configurable device (100), the pre-operating system agent (106) may provide such services to the configurable device (100). The services may include, for example, storage of an operating system package (108) on the computing resources (102), instantiating of an operating system (107) using the stored operating system package (108), and performing post-operating system automation to place the configurable device (100) in a predetermined state. The predetermined state may include hosting of the applications (109).

In one or more embodiments of the invention, the pre-operating system agent (106) is instantiated in the computing resources (102) by the out-of-band management platform (110). As will be discussed in greater detail below, the out-of-band management platform (110) may orchestrate configuration of the configurable device (100).

Additionally, the computing resources (102) may support an in-band channel (132). For example, the computing resources (102) may include a network adapter that supports communications via the network (130). Alternatively, the always-on in-band channel may be a bus between the out-of-band management platform (110) and the computing resources (102).

In one or more embodiments of the invention, the out-of-band management platform (110) orchestrates configuration of the configurable device (100). To orchestrate configuration of the configurable device (100), the out-of-band management platform (110) may: (i) determine an identity of the configurable device (100), (ii) obtain a configurable device profile associated with the configurable device (100), (iii) instantiate the pre-operating system agent (106), (iv) orchestrate storage of the operating system package (108) in the computing resources (102) of the configurable device (100), (v) instantiate an operating system (107) in the computing resources (102) using the operating system package (108), and/or (vi) orchestrate post-operating system automation to place the configurable device in a predetermined state. Orchestrating the post-operating system automation may instantiate the applications (109). To provide the aforementioned functionality, the out-of-band management platform (110) may perform all, or portion, of the methods illustrated in FIGS. 2-4.

Additionally, the out-of-band management platform (110) may support an out-of-band channel (134). For example, the out-of-band management platform (110) may include a network adapter, separate from a network adapter of the computing resources (102), which supports communications via the network (130). Further, the out-of-band management platform (110) may support an always-on in-band channel (136) between the out-of-band management platform (110) and the computing resources (102) of the configurable device (100). For example, the out-of-band management platform (110) may be directly connected to the computing resources (102) by a network bus or other communication channel that is not impacted by components external to the configurable device (100).

In some embodiments of the invention, the always-on in-band channel (136) is the same as the in-band channel (132). For example, the computing resources (102) and the out-of-band management platform (110) may each include separate network adapters operably connected via the network (130) and, thereby, provide a communication channel between the computing resources (102) and the out-of-band management platform (110).

In one more embodiments of the invention, the computing resources (102) and the out-of-band management platform (110) are identified as separate devices for networking purposes. For example, each of these components may include separate network identification information such as media access control addresses and/or Internet protocol addresses. Thus, each of these components of the configurable device (100) may present themselves as separate devices to other entities operably connected to the network (130).

The out-of-band management platform (110) may be a physical device. The physical device may be a computing device. The computing device may be, for example, an embedded hardware device such as, for example, an expansion card, a component integrated into a mainboard of a computing device, or another hardware entity. The computing device may include one or more processors, memory (e.g., random access memory), and persistent storage (e.g., disk drives, solid state drives, etc.). An example computing device is shown in FIG. 6. The persistent storage may store computer instructions, e.g., computer code, that when executed by the processor(s) of the computing device cause the computing device to perform the functions of the out-of-band management platform (110) described in this application and/or all, or a portion, of the methods illustrated in FIGS. 2-4. The out-of-band management platform (110) may be other types of computing devices without departing from the invention. For additional details regarding the out-of-band management platform (110), refer to FIG. 1.2.

While the out-of-band management platform (110) has been described as a physical device, the out-of-band management platform (110) may be implemented as a logical device, e.g., a virtual device, which utilizes computing resources of other physical computing devices without departing from the invention. For example, the out-of-band management platform (110) may be implemented as a logical device that utilizes computing resources of the configurable device (100) or other entities operably connected to the configurable device (100). Further, the out-of-band management platform (110) may be implemented as a management node, i.e., a computing device operably connected to the configurable device (100), or a management console without departing from the invention.

In one or more embodiments of the invention, the configuration data store (120) provides information utilized by the configurable device (100) to configure itself. For example, the configurable device (100) may request information from the configuration data store (120) when configuring itself. In response, the configuration data store (120) may provide the requested information. For additional details regarding the configuration data store (120), refer to FIG. 1.3.

The configuration data store (120) may be a physical device. The physical device may be a computing device. The computing device may be, for example, a mobile phone, tablet computer, laptop computer, desktop computer, server, or cloud resource. The configuration data store (120) may be other types of computing devices without departing from the invention. The computing device may include one or more processors, memory (e.g., random access memory), and persistent storage (e.g., disk drives, solid state drives, etc.). An example computing device is shown in FIG. 6. The persistent storage may store computer instructions, e.g., computer code, that when executed by the processor(s) of the computing device cause the computing device to perform the functions of the configuration data store (120) described in this application and/or all, or a portion, of the methods illustrated in FIGS. 2-4. The configuration data store (120) may be other types of computing devices without departing from the invention.

The configuration data store (120) may be a virtualized entity. For example, the configuration data store (120) may be implemented as a virtual machine that utilizes the computing resources of any number of physical computing devices to provide the functionality of the configuration data store (120).

In one or more embodiments of the invention, the configurable device manager (140) manages the configurable device (100). For example, the configurable device manager (140) may monitor the configuration process of the configurable device (100) and act if the configuration process appears to be unsuccessful. The configurable device manager (140 and monitor any number of configurable devices without departing from the invention.

In one or more embodiments of the invention, the configurable device manager (140) monitors the configuration process of the configurable device (100) by receiving streamed logs of the configuration process from the out-of-band management platform (110). For example, during the configuration process of the computing resources (102) the out-of-band management platform (110) may monitor the state of the computing resources (102) as they are configured. Such state information may be relayed to the configurable device manager (140) via the out-of-band channel (134). The configurable device manager (140) may monitor the configuration of the configurable device (100) via the other methods without departing from the invention.

In one or more embodiments of the invention, the configurable device manager (140) may attempt to remediate the configuration of the configurable device (100) when monitoring of the configuration process indicates a configuration failure. The configurable device manager (140) may attempt to remediate the configuration of the configurable device (100) by sending commands to the out-of-band management platform (110). In turn, the out-of-band management platform (110) may take action based on the commands received from the configurable device manager (140). For example, the out-of-band management platform (110) may modify the state of the computing resources (102) based on a command received from the configurable device manager (140). In other embodiments of the invention, the configurable device manager (140) may remediate the configuration by sending a notification of a configuration failure to a client or administrator associated with the configurable device (100). By doing so, the configurable device manager (140) may notify an associated entity that the configuration process failed.

The configurable device manager (140) may be a physical device. The physical device may be a computing device. The computing device may be, for example, a mobile phone, tablet computer, laptop computer, desktop computer, server, or cloud resource. The configurable device manager (140) may be other types of computing devices without departing from the invention. The computing device may include one or more processors, memory (e.g., random access memory), and persistent storage (e.g., disk drives, solid state drives, etc.). An example computing device is shown in FIG. 6. The persistent storage may store computer instructions, e.g., computer code, that when executed by the processor(s) of the computing device cause the computing device to perform the functions of the configurable device manager (140) described in this application and/or all, or a portion, of the methods illustrated in FIGS. 2-4. The configurable device manager (140) may be other types of computing devices without departing from the invention.

The configurable device manager (140) may be a virtualized entity. For example, the configurable device manager (140) may be implemented as a virtual machine that utilizes the computing resources of any number of physical computing devices to provide the functionality of the configurable device manager (140).

As discussed above, the out-of-band management platform (110) may provide configuration services to the configurable device (100). FIG. 1.2 shows a diagram of an out-of-band management platform (110) in accordance with one or more embodiments of the invention. To provide the above noted functions, the out-of-band management platform (110) may include a configuration manager (112) and a persistent storage (114). Each component of the out-of-band management platform (110) is discussed below.

In one or more embodiments of the invention, the configuration manager (112) manages configuration of the computing resources of a configurable device hosting the out-of-band management platform (110). To manage the configuration of the computing resources, the configuration manager (112) may perform all, or a portion, of the method illustrated in FIGS. 2-4.

To provide these functions, the out-of-band management platform (110) may include functionality to operate as a Representational State Transfer (REST) end point. For example, the out-of-band management platform (110) may be addressed as a web resource that provides a limited number of functions operable through the REST interface. In one or more embodiments of the invention, the REST end point includes functionality to initiate configuration of the configurable device (100, FIG. 1.1).

Additionally, the out-of-band management platform (110) may include functionality to directly interface with the computing resources of the configurable device. For example, the out-of-band management platform (110) may be connected to the computing resources of the configurable device via a dedicated bus. By doing so, the out-of-band management platform (110) may support an always on in-band channel to the computing resources of the configurable device.

In one or more embodiments of the invention, the configuration manager (112) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device cause the physical device to perform the functions of the out-of-band management platform (110) described throughout this application.

In one or more embodiments of the invention, the configuration manager (112) is implemented as a logical entity. For example, the configuration manager (112) may be an application executing using computing resources of the out-of-band management platform (110).

In one or more embodiments of the invention, the persistent storage (114) is a physical device for storing digital data. The persistent storage (114) may include any number of physical devices for storing digital data. The physical devices may be, for example, hard disk drives, solid state drives, tape drives, and any other type of physical device for persistent storage of data.

In one or more embodiments of the invention, the persistent storage (114) is a virtualized resource. For example, the persistent storage (114) may be a virtual drive. The virtual drive may use computing resources of any number of physical computing devices without departing from the invention.

In one or more embodiments of the invention, the persistent storage (114) stores data structures used for configuration of configurable devices. For example, the persistent storage (114) may store a configurable device profile for a host device (114.2), a pre-operating system agent for a host device (114.4), pre-operating system logs (114.6), and/or post-operating system logs (114.8). Each of these data structures is discussed below.

The configurable device profile for the host device (114.2) may be a data structure that stores information regarding a predetermined state for the configurable device that hosts the out-of-band management platform (110). For example, the configurable device profile may include the name of the configurable device, a description of the configurable device, a version of the configurable device, one or more locations of information that may be used in the configuration process of the configurable device, a location of an operating system for the configurable device, a location of a pre-operating system agent for the configurable device, a storage application for logs generated during the configuration of the configurable device, and one or more steps for automation after instantiation of an operating system that will place the configurable device in the predetermined state. The one or more steps for automation after instantiation of the operating system may include instantiation of any number of resources such as, for example, applications, virtual resources, or any other type of virtualized resource.

The pre-operating system agent for the host device (114.4) may be a data structure that is an image of a pre-operating system agent to be instantiated on the configurable device. The pre-operating system agent, after instantiation on the configurable device, may: (i) store data in the configurable device, (ii) instantiate an operating system in the configurable device, (iii) initiate posts operating system automation in the configurable device, and/or (iv) perform logging of the configuration process. Additionally, the pre-operating system agent may take remedial action in the event of configuration failure.

The pre-operating system logs (114.6) may be a data structure that stores information regarding the configuration process of a configurable device before an operating system is instantiated in the configurable device. For example, the pre-operating system logs (114.6) may include changes to computing resources of the configurable device before an operating system is instantiated.

The post-operating system logs (114.8) may be a data structure that stores information regarding the configuration process of the configurable device after an operating system is instantiated in the configurable device. For example, the post-operating system logs (114.8) may include attempts at instantiation of applications or other entities after an operating system is instantiated.

The logs (114.6, 114.8) may include other information without departing from the invention.

While the persistent storage (114) is illustrated as including the limited number of data structures, the persistent storage (114), may store additional, fewer, or different data structures and that illustrated in FIG. 1.2 without departing from the invention. Additionally, any of the data structures illustrated in FIG. 1.2 may be combined with other data, broken down into multiple data structures, stored in different locations, replicated, and/or spanned across any number of computing devices without departing from the invention.

As discussed above, the configuration data store (120) may store information used for configuration of configurable devices. FIG. 1.3 shows a diagram of a configuration data store (120) in accordance with one or more embodiments of the invention. To provide the above noted functions the configuration data store (120) may include a persistent storage (122) that stores data structures. In response to requests from entities of the system of FIG. 1.1, the configuration data store (120) may provide copies of the data structures stored in the persistent storage (122).

In one or more embodiments of the invention, the persistent storage (122) is a physical device for storing digital data. The persistent storage (122) may include any number of physical devices for storing digital data. The physical devices may be, for example, hard disk drives, solid state drives, tape drives, and any other type of physical device for persistent storage of data.

In one or more embodiments of the invention, the persistent storage (122) is a virtualized resource. For example, the persistent storage (122) may be a virtual drive. The virtual drive may use computing resources of any number of physical computing devices without departing from the invention.

In one or more embodiments of the invention, the persistent storage (122) stores data structures used for configuration of configurable devices. For example, the persistent storage (122) may store configurable device profiles (122.2), operating system images (122.4), scripts (122.6), and/or drivers (122.8). Each of these data structures are discussed below.

The configurable device profiles (122.2) may be a data structure including profiles for any number of configurable devices. Each of the profiles may be similar to the configurable device profile host device (114.2, FIG. 1.2) described with respect to FIG. 1.2. Each of the profiles may include information specific to respective configurable devices.

The operating system images (122.4) may be data structures that reflect predetermined states of operating systems. The operating system images (122.4) may include any number of images of any number and type of operating systems in any number and type of states.

The scripts (122.6) may be data structures that specify a workflow(s) to be performed for configuration of configurable devices. For example, the scripts (122.6) may specify workflows to be performed by a configurable device after an operating system is instantiated during a configuration process. The scripts (122.6) may include workflows for other portions of the configuration process of configurable devices without departing from the invention.

The drivers (122.8) may be data structures that include software for computing resources of configurable devices. For example, the drivers (122.8) may be software for storage devices, memory, processors, network devices, or other hardware devices of the configurable device that enables the aforementioned hardware devices to function.

While the persistent storage (122) is illustrated as including the limited number of data structures, the persistent storage (122), may store additional, fewer, or different data structures and that illustrated in FIG. 1.3 without departing from the invention. Additionally, any of the data structures illustrated in FIG. 1.3 may be combined with other data, broken down into multiple data structures, stored in different locations, and/or spanned across any number of computing devices without departing from the invention.

As discussed above, configuration of a configurable device may be orchestrated by an out-of-band management platform (110) hosted by the configurable device. FIG. 2 shows methods in accordance with one or more embodiments of the invention that may be performed by components of the system of FIG. 1.1.

FIG. 2 shows a flowchart of a method in accordance with one or more embodiments of the invention. The method depicted in FIG. 2 may be used to configure a configurable device in accordance with one or more embodiments of the invention. The method shown in FIG. 2 may be performed by, for example, an out-of-band management platform (e.g., 110, FIG. 1.1). Other components of the system illustrated in FIG. 1.1 may perform the method of FIG. 2 without departing from the invention.

In step 200, a configuration request for a configurable device is obtained.

In one or more embodiments of the invention, the configuration request is obtained from a configurable device manager. The configuration request may be obtained from other entities without departing from the invention.

In one or more embodiments of the invention, the configuration request is obtained from the configurable device. For example, when a configurable device is powered on, if the configurable device is not in a configured state configurable device may send a configuration request.

In one or more embodiments of the invention, the configuration request includes an identifier of the configurable device. The identifier may be, for example, the name of the configurable device, a type of the configurable device, or another descriptor that enables an entity to discriminate the configurable device from other devices.

In step 202, a configurable device profile associated with the configurable device is obtained using an out-of-band channel.

In one or more embodiments of the invention, the configurable device profile is obtained from a configuration data store. The configurable device profile may be associated with an identifier of the configurable device. The identifier of the configurable device may be sent to the configuration data store. In response to receiving the identifier, the configuration data store may provide the configurable device profile.

In one or more embodiments of the invention, during step 202, the computing resources of the configurable device are unaware of the network environment in which the configurable device is operating. For example, the configurable device may be unaware of the configuration data store. In contrast, the out-of-band management platform may be aware of the configuration data store. Thus, the computing resources of the configurable device may be unable to retrieve the configurable device profile associated with the configurable device at the time the configurable device profile is obtained by the out-of-band management platform. Consequently, embodiments of the invention may enable the configurable device to be configured in a scenario in which the computing resources of the configurable device are unable to securely communicate with entities through an in-band channel supported by the computing resources of the configurable device.

In step 204, a pre-operating system agent is instantiated based on the configurable device profile.

In one or more embodiments of the invention, the pre-operating system agent is instantiated by booting the pre-operating system agent in the computing resources of the configurable device using the computing resources of the out-of-band management platform. For example, an image of the pre-operating system agent may be stored in persistent storage of the out-of-band management platform. The pre-operating system agent may be instantiated in the computing resources of the configurable device directly from the persistent storage of the out-of-band management platform. In one or more embodiments of the invention, the instantiation may be performed via the always on in-band channel between the out-of-band management platform and the computing resources of the configurable device.

One or more embodiments of the invention, an image of the pre-operating system agent is obtained by the out-of-band management platform by requesting an image from the configuration data store. The image may be obtained from other entities without departing from the invention. The image of the pre-operating system agent may be obtained based on a configurable device profile associated with the configurable device. For example, the configurable device profile may specify an identity of the pre-operating system agent to be instantiated in the computing resources of the configurable device.

In step 206, an operating system package is obtained using an in-band channel secured by the pre-operating system agent.

In one or more embodiments of the invention, the operating system package is obtained by a pre-operating system agent executing using the computing resources of the configurable device. For example, the pre-operating system agent may use a network adapter to communicate via the in-band channel with the configuration data store to obtain the operating system package. Thus, the out-of-band management platform may orchestrate obtaining of the operating system package be the instantiation of the pre-operating system agent in step 204.

In one or more embodiments of the invention, the operating system package includes one or more of: (i) an operating system image, (ii) drivers for computing resources, and (iii) scripts that enforce workflows for configuring the configurable device. The operating system package may include additional or different data without departing from the invention.

In step 208, the configurable device is booted using the operating system package.

In one or more embodiments of the invention, logs of the boot process are streamed to other entities using the out-of-band channel. For example, the out-of-band management platform hosted by the configurable device may monitor booting of the configurable device. In turn, the out-of-band management platform may stream information regarding booting of the configurable device to other entities. The out-of-band management platform may perform the streaming using a network adapter of the out-of-band management platform that supports communications via the out-of-band channel.

In one or more embodiments of the invention, logs of the boot process are streamed to other entities using the in-band channel.

In one or more embodiments of the invention, the logs also include information regarding obtaining of the operating system package of step 206. For example, the log may indicate information regarding the operating system package itself or the process by which the operating system package was obtained such as an identifier of the entity from which the operating system package was obtained. The logs may include additional information regarding the configuration process up to and/or including step 208 without departing from the invention.

In one or more embodiments of the invention, booting the configurable device using the operating system package instantiates an operating system in the computing resources of the configurable device. By doing so, the configurable device may be placed in a first predetermined state. In the first predetermined state, the configurable device may not be able to perform its predetermined functionality and may require further configuration before being able to perform its predetermined functionality.

In step 210, post-operating system automation of the configurable device is performed.

In one or more embodiments of the invention, performing the post-operating system automation places the configurable device into a second predetermined state. In the second predetermined state, the configurable device may be able to perform its predetermined functionality.

In one or more embodiments of the invention, performing the post-operating system automation includes one or more of: (i) instantiating a virtual resource such as a virtual storage, (ii) instantiating a virtual machine, (iii) instantiating any number of applications, (iv) modifying configuration settings of the operating system, and (v) notifying other entities that the configurable device has completed configuration. Performing the post-operating system automation may include additional or different steps/acts without departing from the invention.

In one or more embodiments of the invention, logs of the post-operating system automation are streamed to other entities during performance of the post-operating system automation. For example, the out-of-band management platform hosted by the configurable device may monitor post-operating system automation of the configurable device. In turn, the out-of-band management platform may stream information regarding post-operating system automation of the configurable device to other entities. The out-of-band management platform may perform the streaming using a network adapter of the out-of-band management platform that supports communications via the out-of-band channel. The out-of-band management platform may perform the streaming an in-band channel without departing from the invention.

In one or more embodiments of the invention, performing the post-operating system automation causes the configurable device to perform predetermined functions. For example, the predetermined functions may be to interact with other configurable devices to provide functionality of a distributed system, to enable applications hosted by the configurable device to provide services to other entities, or to perform other computer enabled services.

The method may end following step 210.

Figure 3:
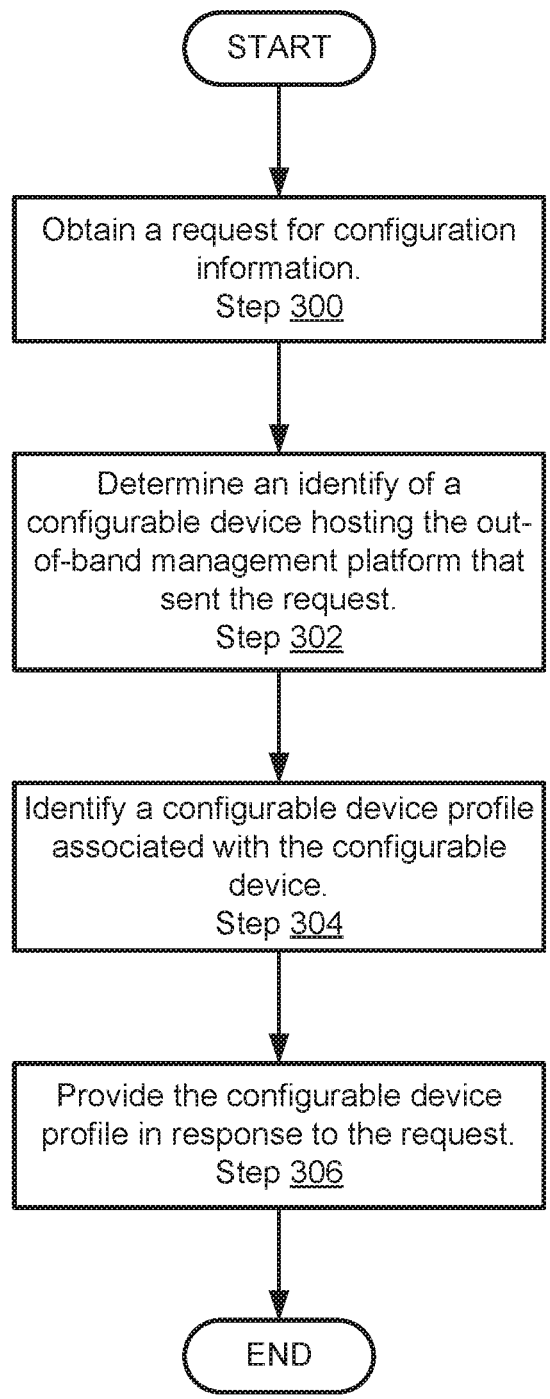
FIG. 3 shows a flowchart of a method of providing configurable devices profiles in accordance with one or more embodiments of the invention.

As discussed above, a configuration data store may provide data structures for configuration of a configurable device. FIG. 3 shows methods in accordance with one or more embodiments of the invention that may be performed by components of the system of FIG. 1.1.

FIG. 3 shows a flowchart of a method in accordance with one or more embodiments of the invention. The method depicted in FIG. 3 may be used to provide data structures for configuration of the configurable device in accordance with one or more embodiments of the invention. The method shown in FIG. 3 may be performed by, for example, a configuration data store (e.g., 120, FIG. 1.1). Other components of the system illustrated in FIG. 1.1 may perform the method of FIG. 3 without departing from the invention.

In step 300, a request for configuration information is obtained.

In one or more embodiments of the invention, the request is obtained from an out-of-band management platform hosted by a configurable device. The request may specify an identity of the configurable device.

In one or more embodiments of the invention, the request is obtained via an out-of-band channel associated with the configurable device. For example, the out-of-band management platform hosted by the configurable device may send the request via the out-of-band channel.

In step 302 an identity of the configurable device hosting the out-of-band management platform that sent the request is determined. As noted above, and identifier of the configurable device may be included in the request and, thereby, enable an identity of the configurable device to be determined. The identity of the configurable device may be determined the other methods without departing from the invention.

In step 304, a configurable device profile associated with the configurable device is identified.

In one or more embodiments of the invention, the configuration data store includes a repository that stores any number of configurable device profiles associated with any number of configurable devices. The configurable device profile may be identified by matching and identity of the configurable device to corresponding configurable device profile.

In step 306, the configurable device profile is provided in response to the request.

In one or more embodiments of the invention, the configurable device profile is provided via an out-of-band channel associated with the configurable device. For example, the configurable device profile may be sent to an out-of-band management platform hosted by the configurable device via the out-of-band channel.

The method may end following step 306.

Via the method illustrated in FIG. 3, embodiments of the invention may enable any number of different configurable devices to be configured into any number of predetermined states. Further, in addition to providing configurable device profiles, the configuration data store may also provide other information for configuration purposes. The other information may be, for example, an operating system package. In this manner, embodiments of the invention may provide all necessary data for configuration of each configurable device.

Figure 4:
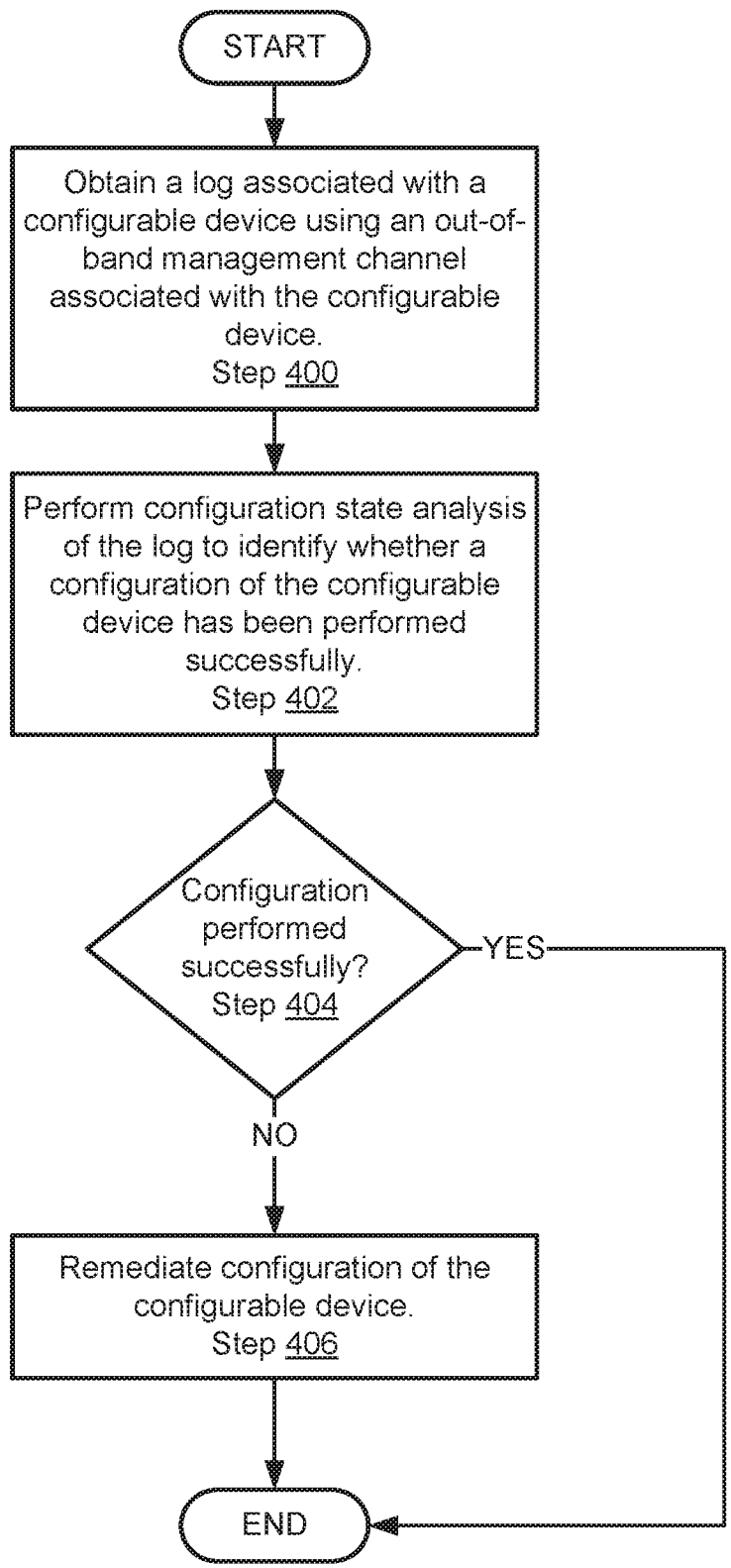
FIG. 4 shows a flowchart of a method of managing configuration of configurable devices in accordance with one or more embodiments of the invention.

As discussed above, a configurable device manager may monitor the configuration of one or more configurable devices. FIG. 4 shows methods in accordance with one or more embodiments of the invention that may be performed by components of the system of FIG. 1.1.

FIG. 4 shows a flowchart of a method in accordance with one or more embodiments of the invention. The method depicted in FIG. 4 may be used to monitor the configuration of configurable devices in accordance with one or more embodiments of the invention. The method shown in FIG. 4 may be performed by, for example, a configuration device manager (e.g., 140, FIG. 1.1). Other components of the system illustrated in FIG. 1.1 may perform the method of FIG. 4 without departing from the invention.

In step 400, a log associated with the configurable device is obtained using an out-of-band management channel associated with the configurable device. The log may specify any number of events that occurred during the configuration process. The log may include additional information without departing from the invention.

In one or more embodiments of the invention, the out-of-band management channel supported by an out-of-band management platform is hosted by the configurable device. The out-of-band management platform hosted by the configurable device may monitor the configuration process being performed on the configurable device. The monitoring of the configuration process may be used to generate a log which is streamed to the configurable device manager.

In step 402, a configuration state analysis of the log is performed to identify whether a configuration of the configurable device has been performed successfully.

In one or more embodiments of the invention, the configuration state analysis is performed by comparing various states of the configurable device to predetermined states associated with the configuration process. If the comparison indicates a difference between the various states and the predetermined states, the configuration may be identified as being unsuccessful.

In one or more embodiments of the invention, the configuration state analysis is performed by matching predetermined events to entries of the log. For example, predetermined events may be associated with either a success or failure of the configuration process. If a match is detected, the configuration process may be identified as successful or unsuccessful depending on the match. For example, an event that indicates that a storage of the configurable device has failed may indicate a failure of the configuration process. In contrast, an event that indicates successful installation of drivers may indicate a success of the configuration process.

In step 404, it is determined whether the configuration was performed successfully. If the configuration is performed successfully, the method may and following step 404. If the configuration was not performed successfully, the method may proceed to step 406.

In step 406, the configuration of the configurable device is remediated.

In one or more embodiments of the invention, the configuration is remediated by sending a command to an out-of-band management platform hosted by the configurable device. The command may cause the out-of-band management platform to perform an action on the computing resources of the configurable device. For example, the action may be to modify driver setting, instantiate an application, modify the configuration of the operating system, or otherwise change the state of the computing resources of the configurable device. Such actions may be taken by the configurable device manager when it appears that a configuration process may be saved. In other words, when a correction to a configuration process may result in a successful configuration of the configurable device.

In one or more embodiments of the invention, the configuration is remediated by notifying other entities that the configuration process was unsuccessful. For example, notifications may be sent to clients, other configurable devices, administrators, and/or other entities that may be relying on or otherwise invested in the outcome of the configuration process of the configurable device.

The method may end following step 406.

The logs discussed in FIG. 4 may be with respect to any portion of a process of configuring a configurable device.

To further clarify aspects of the invention, a non-limiting example is provided in FIGS. 5.1-5.5.

Example

Consider a scenario as illustrated in FIG. 5.1 in which a configurable device (500) is first powered on after being installed at a predetermined location. After being powered up, computing resources (502) of the configurable device (500) identify that the computing resources (502) are not hosting an operating system nor is an image of an operating system stored in a persistent storage (504) of the computing resources (502).

In response to this determination, the computing resources (502) send a request for configuration to an out-of-band management platform (520) hosted by the configurable device (500). In response to receiving the request, the out-of-band management platform (520) orchestrates the configuration process of the computing resources (502).

To orchestrate the configuration process, the out-of-band management platform (520) determines an identity of the configurable device (500). The out-of-band management platform (520) sends the identity to a configuration data store (not shown) using an out-of-band channel. In response, the configuration data store (not shown) sends a configurable device profile to the out-of-band management platform (520) using the out-of-band channel.

Using the configurable device profile, the out-of-band management platform (520) instantiates a pre-operating system agent (506) in the computing resources (502) as illustrated in FIG. 5.2. After instantiation, the pre-operating system agent (506) connects to the configuration data store using an in-band channel. The pre-operating system agent (506) requests an operating system package from the configuration data store. In response to the request, the configuration data store sends an operating system package to the configurable device (500) which is stored in the persistent storage (504) as illustrated in FIG. 5.3.

Using the operating system package (508), the pre-operating system agent (506) boots an operating system (510) in the computing resources (502) as illustrated in FIG. 5.4. After successfully booting the operating system (510), post-operating system automation is initiated by executing one or more scripts included in the operating system package (508). Performing the post-operating system automation instantiates applications (512) in the computing resources (502) as illustrated in FIG. 5.5.

Thus, at completion of the configuration of the configurable device (500), the configurable device (500) is able to provide services to other entities via applications (512) hosted by the computing resources (502) of the configurable device (500).

End of Example

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device. The communication interface (612) may include a network adapter or other hardware element that supports communications via any type of networking technology/standard.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may improve the field of distributed system technology. Specifically, embodiments of the invention may improve distributed system technology by improving the reliability of configuration of configurable devices in a distributed system. For example, embodiments of the invention may enable real-time logging of configuration processes of configurable devices via an out-of-band channel. By doing so, the configurable device did not have: (i) knowledge of a networking environment in which it resides, (ii) knowledge of locations where data or configuration of the configurable device resides, and (iii) the capacity for in-band channel communications. Thus, embodiments of the invention may enable out-of-the-box device level configuration of any number of configurable devices.

Further embodiments of the invention may improve the field of computing devices by enabling configurable devices to continuously stream, or otherwise provide notice, the configuration status of the configuration process throughout the configuration process. By doing so, embodiments of the invention may improve the rate by which configuration failures are detected. In contrast, contemporary systems that rely on endpoint detection, or other indirect indicators of configuration failure, they require substantially more time to detect configuration failures.

Thus, embodiments of the invention directly address problems arising due to the nature of the technological environment of distributed systems. Specifically, as distributed systems increase in their complexity, the number of configurable devices required to be configured increases exponentially. Any delays in detection of configuration failure make such processes ineffective as a number of configurable devices scales. Accordingly, embodiments of the invention directly address such problems by reducing the time required to detect configuration failure. Embodiments of the invention may address this, and other problems, by providing a method and system that enables for continuous detection of configuration failures even for configurable devices that do not have functional in-band channels.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A configurable device, comprising:
computing resources; and
an out-of-band management platform programmed to:
  obtain a configuration request for the configurable device to place the configurable device into a predetermined state;
  in response to obtaining the configuration request:
    obtain a configurable device profile associated with the configurable device using an out-of-band channel;
    instantiate a pre-operating system agent based on the configurable device profile using the computing resources;
    load an operating system package into the computing resources using an in-band channel secured by the pre-operating system agent;
    boot the configurable device using:
      the operating system package, and
      the computing resources; and
    after booting the configurable device:
      orchestrate post-operating system automation of the configurable device to place the configurable device into the predetermined state.

2. The configurable device of claim 1, wherein the out-of-band management platform is further programmed to:
while booting the configurable device, streaming logs of the boot using the out-of-band channel.

3. The configurable device of claim 2, wherein streaming the logs of the boot using the out-of-band channel comprises obtaining the logs of the boot from the pre-operating system agent using an always-on in-band channel.

4. The configurable device of claim 1, wherein the out-of-band management platform is further programmed to:
while orchestrating post-operating system automation, streaming logs of the post-operating system automation using the out-of-band channel.

5. The configurable device of claim 4, wherein streaming the logs of the post-operating system automation using the out-of-band channel comprises obtaining the logs of the post-operating system automation from the pre-operating system agent using an always-on in-band channel.

6. The configurable device of claim 1, wherein loading the operating system package into the computing resources using the in-band channel secured by the pre-operating system agent comprises:
- identifying a location where at least a portion of the operating system package is stored by the pre-operating system agent; and
- obtaining the operating system package from the location by the pre-operating system agent.

7. The configurable device of claim 1, wherein instantiating the pre-operating system agent based on the configurable device profile using the computing resources comprises:
- loading an image of the pre-operating system agent stored in persistent storage of the out-of-band management platform on the computing resources;
- loading at least a portion of the image into a memory of the computing resources; and
- initiating execution of the pre-operating system agent using the image.

8. A method for configuring a configurable device, comprising:
- obtaining a configuration request for the configurable device to place the configurable device into a predetermined state, wherein the configuration request is obtained using an out-of-band channel associated with the configurable device;
- in response to obtaining the configuration request:
  - obtaining a configurable device profile associated with the configurable device using the out-of-band channel associated with the configurable device;
  - instantiating a pre-operating system agent based on the configurable device profile using computing resources of the configurable device;
  - loading an operating system package into the computing resources using an in-band channel secured by the pre-operating system agent;
  - booting the configurable device using:
    - the operating system package, and
    - the computing resources; and
  - after booting the configurable device:
    - orchestrating post-operating system automation of the configurable device to place the configurable device into the predetermined state.

9. The method of claim 8, further comprising:
- while booting the configurable device, streaming logs of the boot using the out-of-band channel.

10. The method of claim 9, wherein streaming the logs of the boot using the out-of-band channel comprises obtaining the logs of the boot from the pre-operating system agent using an always-on in-band channel.

11. The method of claim 8, further comprising:
- while orchestrating post-operating system automation, streaming logs of the post-operating system automation using the out-of-band channel.

12. The method of claim 11, wherein streaming the logs of the post-operating system automation using the out-of-band management channel comprises obtaining the logs of the post-operating system automation from the pre-operating system agent using an always-on in-band channel.

13. The method of claim 8, wherein loading the operating system package into the computing resources using the in-band channel secured by the pre-operating system agent comprises:
- identifying a location where at least a portion of the operating system package is stored by the pre-operating system agent; and
- obtaining the operating system package from the location by the pre-operating system agent.

14. The method of claim 8, wherein instantiating the pre-operating system agent based on the configurable device profile using the computing resources comprises:
- loading an image of the pre-operating system agent stored in a persistent storage of an out-of-band management platform hosted by the configurable device on the computing resources;
- loading at least a portion of the image into a memory of the computing resources; and
- initiating execution of the pre-operating system agent using the image.

15. A non-transitory computer readable medium comprising computer readable program code, which when executed by a computer processor enables the computer processor to perform a method for configuring a configurable device, the method comprising:
- obtaining a configuration request for the configurable device to place the configurable device into a predetermined state, wherein the configuration request is obtained using an out-of-band channel associated with the configurable device;
- in response to obtaining the configuration request:
  - obtaining a configurable device profile associated with the configurable device using the out-of-band channel associated with the configurable device;
  - instantiating a pre-operating system agent based on the configurable device profile using computing resources of the configurable device;
  - loading an operating system package into the computing resources using an in-band channel secured by the pre-operating system agent;
  - booting the configurable device using:
    - the operating system package, and
    - the computing resources; and
  - after booting the configurable device:
    - orchestrating post-operating system automation of the configurable device to place the configurable device into the predetermined state.

16. The non-transitory computer readable medium of claim 15, wherein the method further comprises:
- while booting the configurable device, streaming logs of the boot using the out-of-band channel.

17. The non-transitory computer readable medium of claim 16, wherein streaming the logs of the boot using the out-of-band channel comprises obtaining the logs of the boot from the pre-operating system agent using an always-on in-band channel.

18. The non-transitory computer readable medium of claim 15, wherein the method further comprises:
- while orchestrating post-operating system automation, streaming logs of the post-operating system automation using the out-of-band channel.

19. The non-transitory computer readable medium of claim 18, wherein streaming the logs of the post-operating system automation using the out-of-band management channel comprises obtaining the logs of the post-operating system automation from the pre-operating system agent using an always-on in-band channel.

20. The non-transitory computer readable medium of claim 15, wherein loading the operating system package into the computing resources using the in-band channel secured by the pre-operating system agent comprises:
- identifying a location where at least a portion of the operating system package is stored by the pre-operating system agent; and obtaining the operating system package from the location by the pre-operating system agent.

* * * * *